(No Model.) 6 Sheets—Sheet 1.
T. H. BLAIR & S. E. WATERMAN.
METHOD OF AND APPARATUS FOR MAKING PHOTOGRAPHIC FILMS.
No. 588,790. Patented Aug. 24, 1897.
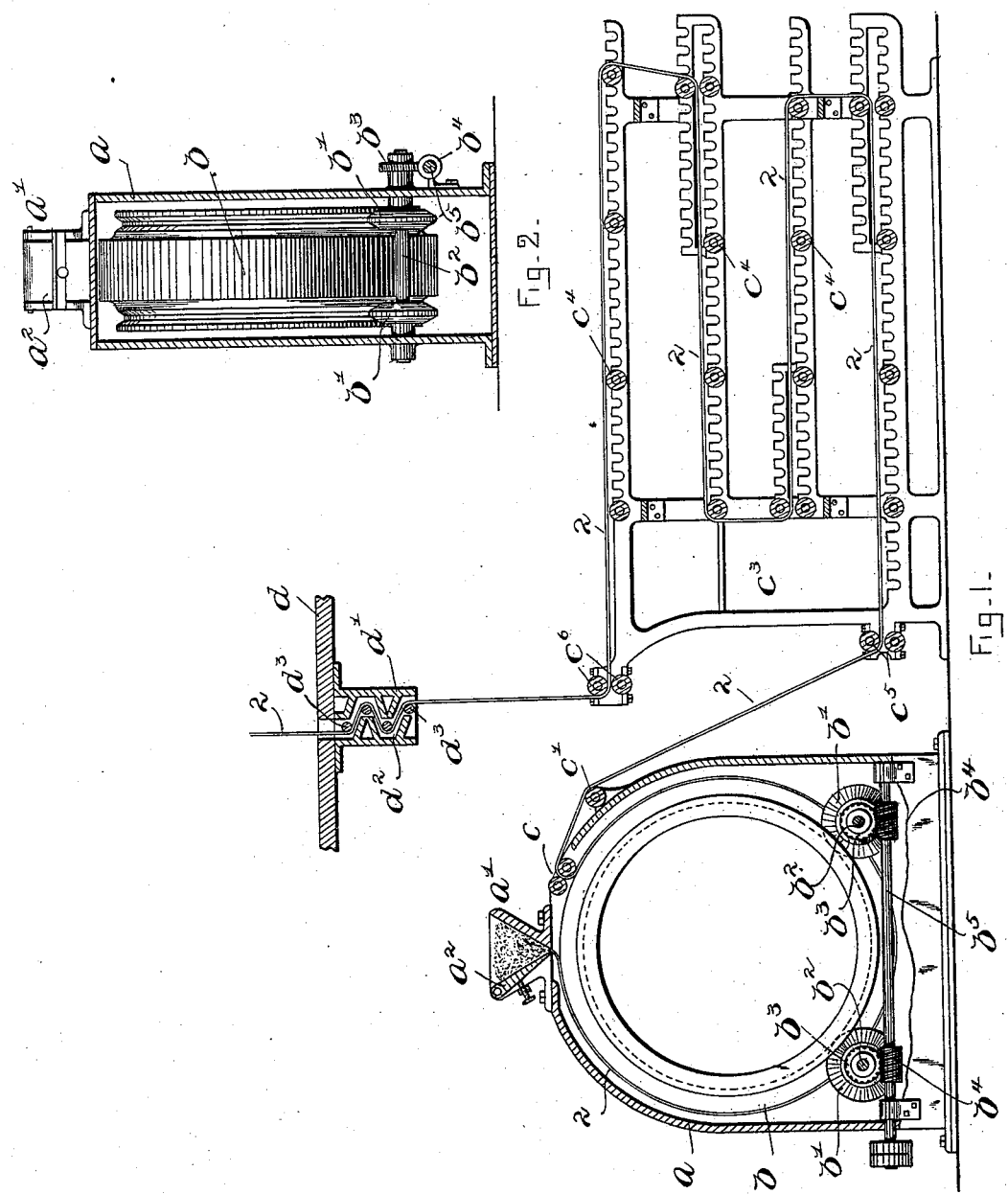
WITNESSES
INVENTORS
T. H. Blair
S. E. Waterman
by Wright Brown Quimby
ATTYS

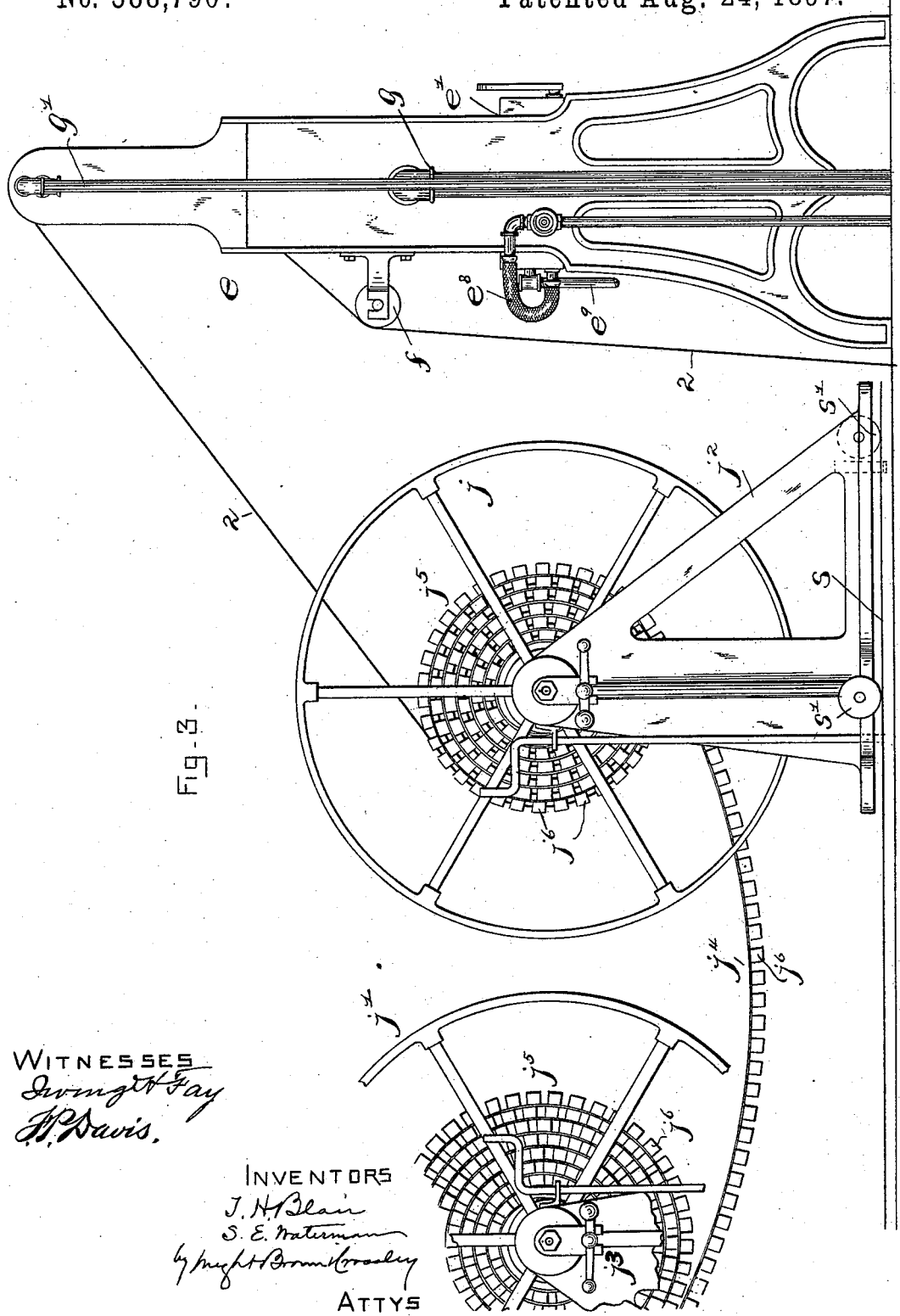

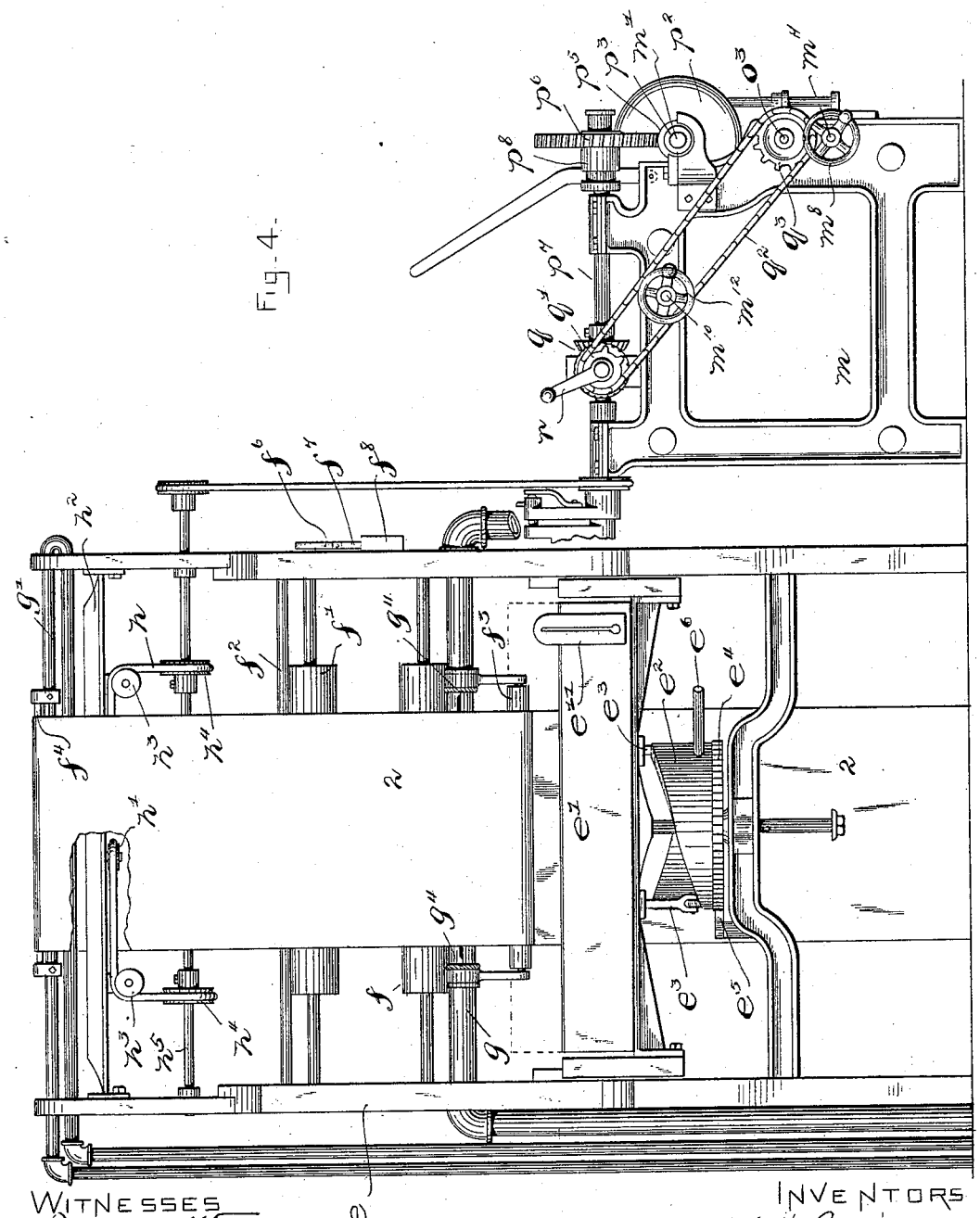

(No Model.) 6 Sheets—Sheet 4.
T. H. BLAIR & S. E. WATERMAN.
METHOD OF AND APPARATUS FOR MAKING PHOTOGRAPHIC FILMS.
No. 588,790. Patented Aug. 24, 1897.
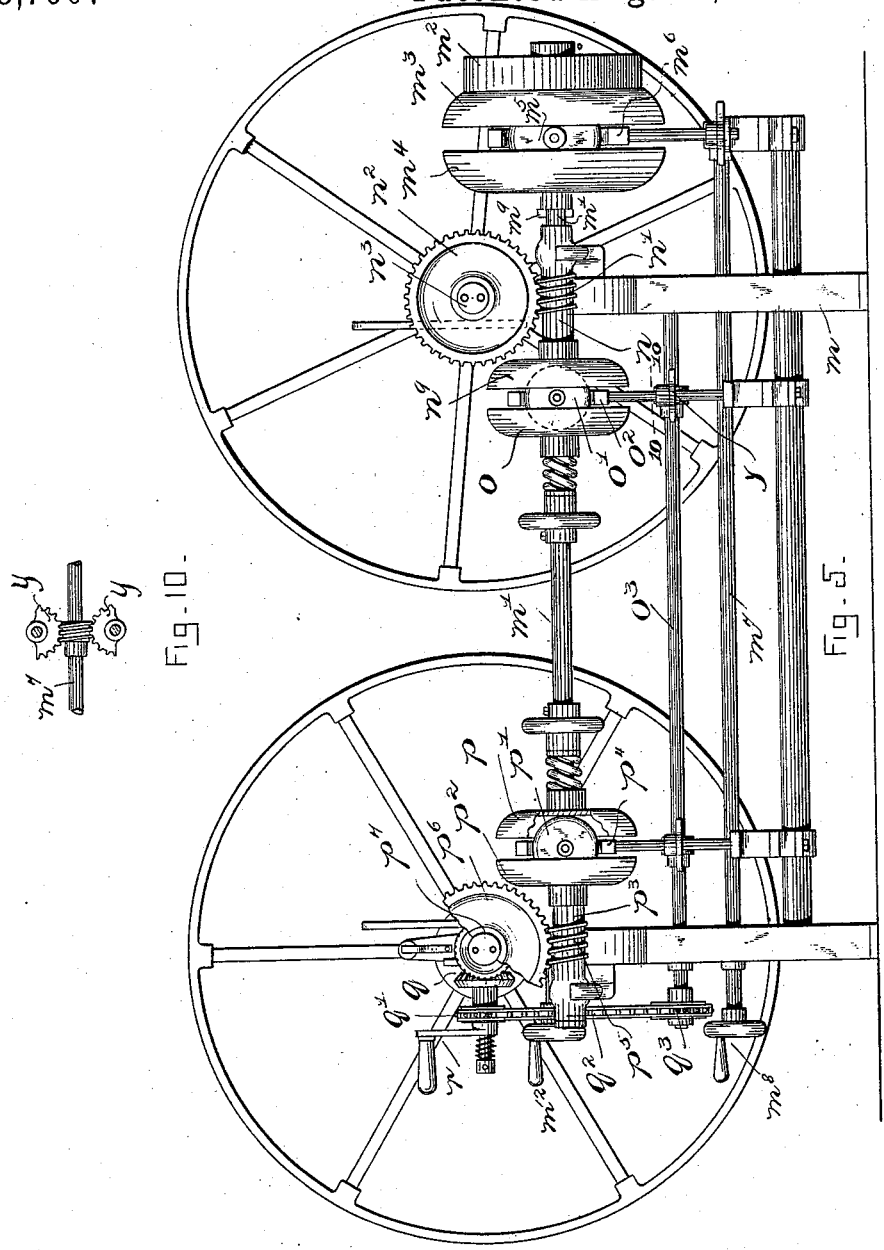
WITNESSES
INVENTORS (No Model.) 6 Sheets—Sheet 5.
T. H. BLAIR & S. E. WATERMAN.
METHOD OF AND APPARATUS FOR MAKING PHOTOGRAPHIC FILMS.
No. 588,790. Patented Aug. 24, 1897.
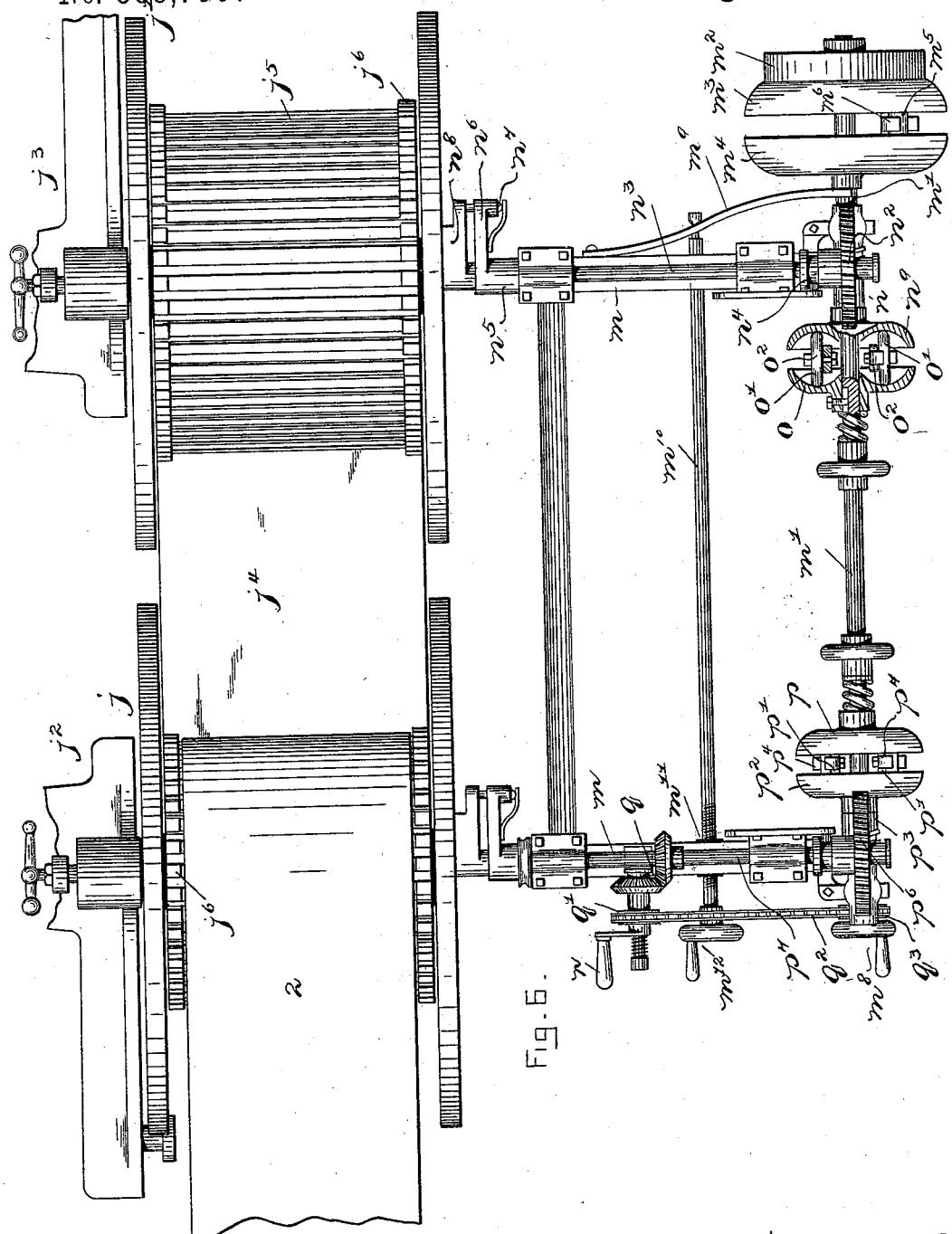
WITNESSES
Irving H. Fay.
J. P. Davis.
INVENTORS
T. H. Blair
S. E. Waterman
by Wight Brown Crosley
ATTYS (No Model.) 6 Sheets—Sheet 6.
T. H. BLAIR & S. E. WATERMAN.
METHOD OF AND APPARATUS FOR MAKING PHOTOGRAPHIC FILMS.
No. 588,790. Patented Aug. 24, 1897.
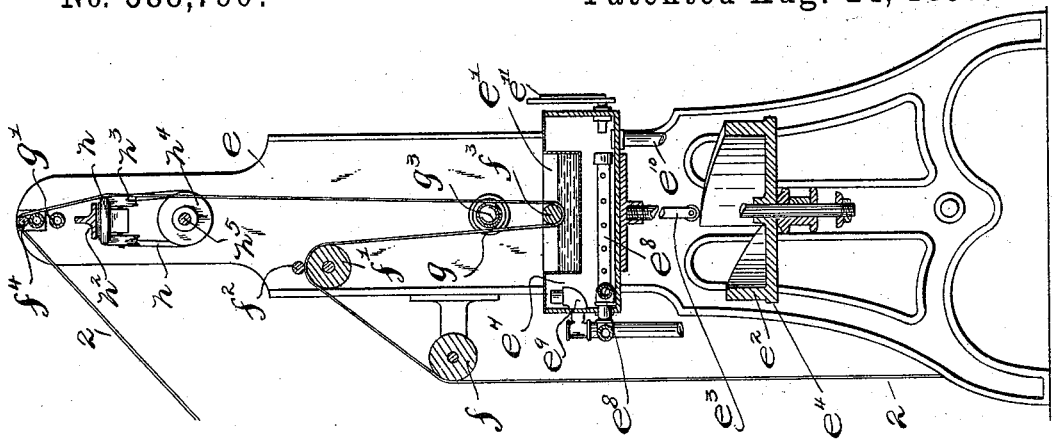
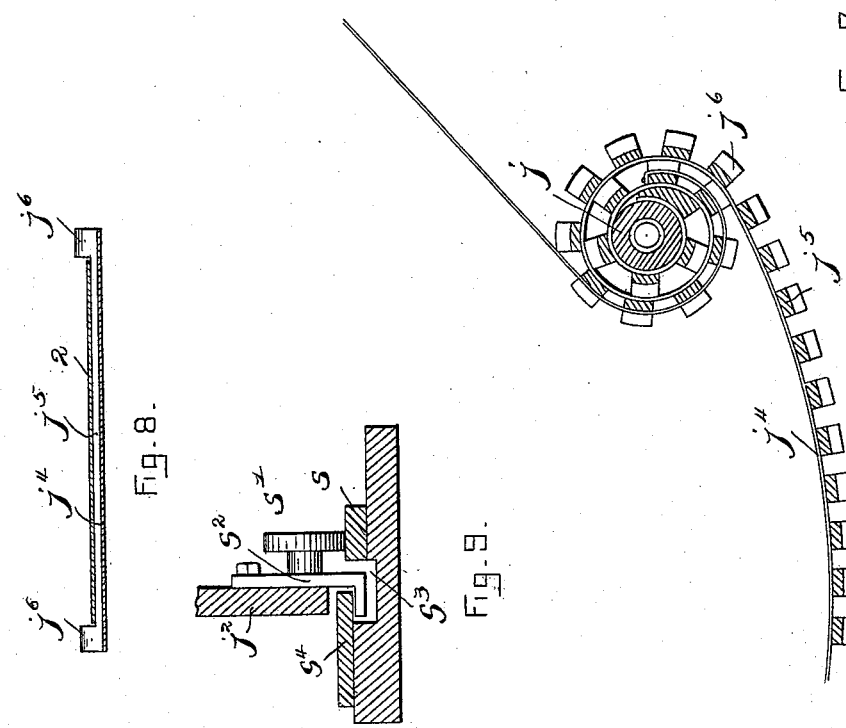
WITNESSES
INVENTORS
ATTYS

UNITED STATES PATENT OFFICE.

THOMAS HENRY BLAIR, OF NORTHBOROUGH, MASSACHUSETTS, AND STUKELY E. WATERMAN, OF PAWTUCKET, RHODE ISLAND, ASSIGNORS, BY MESNE ASSIGNMENTS, TO THE AMERICAN CAMERA MANUFACTURING COMPANY, OF NORTHBOROUGH, MASSACHUSETTS.

METHOD OF AND APPARATUS FOR MAKING PHOTOGRAPHIC FILMS.

SPECIFICATION forming part of Letters Patent No. 588,790, dated August 24, 1897.

Application filed January 3, 1894. Serial No. 495,484. (No model.) Patented in England March 14, 1893, No. 5,504, and in Canada May 1, 1894, No. 45,922.

*To all whom it may concern:*

Be it known that we, THOMAS HENRY BLAIR, of Northborough, in the county of Worcester and State of Massachusetts, and STUKELY E. WATERMAN, of Pawtucket, in the county of Providence and State of Rhode Island, have invented certain new and useful Improvements in Methods of and Apparatus for Making Photographic Films, (for which we have obtained Letters Patent in Great Britain, No. 5,504, dated March 14, 1893, and in Canada, No. 45,922, dated May 1, 1894,) of which the following is a specification.

This invention relates to the manufacture of photographic films for use in what are known to the trade as "roll-holders," in which a long strip of sensitized film is carried, so that different portions of it for receiving impressions may be brought successively before the lens of the camera for exposure.

Hitherto it has been customary to spread the mixture of which the film is composed over a slab of glass or other suitable material and then coat it with a sensitizing solution. This process necessitates a great length of slab and consequently of the room in which it is located and has many drawbacks from a commercial point of view.

Our invention contemplates the formation of a continuous strip of basic film on the peripheral surface of a cylinder which under rotation draws out the strip as the composition or dope is fed onto the surface of the cylinder and further contemplates conducting the strip of basic film over suitable supports and through a suitably-formed light-excluding passage-way into a dark room where by means of suitable guiding-supports the strip is passed through or over a sensitive emulsion, from which the strip or basic film receives a coating of sensitized film, the strip being thence conducted over other supports to an apparatus by which it is rolled up and properly preserved until in marketable condition.

The invention may be said to reside in an improved method of and apparatus for making photographic films employing the above provisions in whole or in part and defined in the claims hereinafter written.

The accompanying drawings illustrate apparatus embodying the invention.

Figure 1 shows a longitudinal section of devices for forming the strip and conducting it to the dark room. Fig. 2 shows an elevation of the forming-cylinder with its inclosing casing in section. Fig. 3 shows a side elevation of the devices located in the dark room and designed to pass the strip through or over the emulsion-bath and to roll it up thereafter. Fig. 4 shows a front end elevation of this part of the apparatus. Fig. 5 shows mainly in side elevation, but partially broken away, the devices for driving the winding-reels. Fig. 6 shows a plan view of said driving devices. Fig. 7 shows a longitudinal vertical section of the apparatus for applying the sensitive emulsion coating and of part of the apparatus for rolling up the film. Fig. 8 shows a detail cross section of the apron in which the film is rolled. Fig. 9 shows a sectional detail of a track on which the reel-carriages run and a portion of one of the carriages. Fig. 10 shows a section on line 10 10 of Fig. 5.

Referring first to Figs. 1 and 2, the letter $a$ designates a suitably-constructed casing, on the upper side of which a hopper $a'$ is supported and within which is a drum or cylinder $b$, whose peripheral surface is under the discharge-opening of the hopper and is of a lateral extent equal to or greater than that of said opening. The discharge-opening of the hopper is elongated and narrow, so as to emit a stream of the composition with which the hopper is charged, said composition having the consistency of thick paste and termed "dope," and forming a foundation or basic film. One side $a^2$ of the hopper may be pivotally supported, as shown, and adjustable to vary the width of the discharge-opening and consequently the thickness of the stream of composition issuing therefrom. The drum or cylinder may be wholly or partially incased, the object of the casing being to exclude dust and also to provide for the maintenance of a prescribed temperature and dryness of the air around the drum. This drum may be constructed in any suitable way, it being highly desirable, however, that its surface be somewhat roughened or ground, as hereinafter described, in order that it may impart a surface to the film, which will enable the latter to hold the sensitive emulsion.

The dope exuding from the hopper encounters the periphery of the drum, and as the latter slowly revolves is drawn out thereby into a thin strip 2, extending over its periphery and adhering thereto.

The drum may be revolved through the agency of any suitable means. It is here shown as resting upon trundles in the form of double conical disks $b'$, engaging V-shaped grooves in the drum and by their frictional engagement therewith adapted to rotate the drum. The said disks are affixed on shafts $b^2$, which carry worm-wheels $b^3$, meshing with worms $b^4$ on a driving-shaft $b^5$.

The strip of dope extends over nearly the entire surface of the drum and is stripped therefrom in proximity to the supply-hopper. The speed of the drum and the condition of the air around the same are so regulated that the dope is sufficiently set and dried when it leaves the drum to be safely handled. The strips of dope, which may now be termed a "basic film," is taken from the drum between a set of idle-rollers $c$, thence over an idler $c'$ on the casing $a$, and is carried over a system of supports suitably arranged, so that the tension on the film may be regulated and the dope may become "seasoned" in its passage over these supports and fit for the sensitive emulsion. The arrangement of supports here shown comprises a rack $c^3$, having tiers of horizontal notched bars, and idlers $c^4$, whose trunnions engage notches in said bars. The film enters the rack between a set of idlers $c^5$ in bearings thereon and is thence conducted in return-bends over the idlers $c^4$, which may be placed variously to support the film as desired and regulate the tension thereof. The film leaves the rack between a set of idlers $c^6$ in bearings thereon and is thence conducted into a dark room. This dark room is preferably above the film-forming apparatus, and in Fig. 1 the letter $d$ designates the floor of said room, which has a slot for the film to enter, and to the under side of which is fastened a casing $d'$, which incloses a zigzag passage $d^2$, open at the lower end and registering with the slot in the floor of the dark room at the upper end. This zigzag passage is of a form which effectually excludes the light, and the film 2 is taken up through it into the dark room, idlers $d^3$ being provided at the bends of the passage-way for the said film to engage.

In the dark room is erected a stand $e$, which supports a trough $e'$, designed to contain a sensitive emulsion which may be maintained at the proper temperature by any suitable means. As here shown the trough is surrounded on its sides and bottom by a chamber $e^7$, into which steam or water may be conducted through a pipe $e^8$, an overflow-pipe $e^9$ being provided and also a drain-pipe $e^{10}$. (See Fig. 7.) By means of a thermometer $e^{11}$ the temperature may be ascertained. The trough preferably engages vertical slideways on the stand, so that it may be moved into and out of operative position, and the means here shown for adjusting the trough comprise a rotatable cam $e^2$, on which rests roller-provided legs $e^3$ of the trough and which carries a ratchet-wheel $e^4$, engaged by a pawl $e^5$. By means of a handle $e^6$, fastened to the cam, it may be turned and its acting surfaces caused to raise the trough or let it down.

The film 2 entering the dark room is taken up over an idle-roller $f$ in bearings on the stand $e$ and thence between a set of idlers, comprising a large roller $f'$ and a small roller $f^2$ and therefrom downwardly and under a small roller $f^3$, which preferably approximates in length the width of the film and which is designed to depend in the trough $e'$ and cause the film to pass through the sensitive emulsion in said trough and become coated therewith on one side. The film with the sensitive coating passes upward from the emulsion and back over the top of the stand over a suitable fixed rod or support, which may be the rod $f^4$ or the pipe $g'$, hereinafter described.

As there is a positive engagement between the roller $f'$ and the film, this roller may be employed as a measurer to coact with a registering device. A band $f^6$ is here shown as engaging an eccentric on the journal of the roller $f'$, and its pitman $f^7$ enters a casing $f^8$, containing a registering mechanism with which said pitman coacts.

The sensitive emulsion being somewhat warm when applied to the film, it is found advantageous to subject the film to a cooling and drying agent after leaving the emulsion, and to this end a cold-air pipe $g$ is extended through the stand behind the film and is slotted for the exit of a blast of cold air against the film, the air being supplied by a suitable blower. A partially-cylindrical valve $g^3$ is arranged within the pipe $g$, and by turning it the slot of the pipe can be opened or closed, said valve being turned by means of milled flanges $g^4$, protruding through the pipe. In the construction here shown the said cold-air pipe is a short distance above the emulsion and the roller $f^3$ is supported by hangers depending from said pipe.

$g'$ represents a circulating-pipe adapted to conduct cold water in suitable proximity to the film to exert a cooling action thereon, said pipe being used chiefly in hot weather when cold air could not have the desired effect. A suitable pump may be connected with the pipe $g'$ to maintain a circulation of water therein. The fixed rod $f^4$, which supports the film above the pipe $g'$, is supported on said pipe and serves to support the film above the pipe, if desired. The film may pass directly over the pipe, however, in which case the rod $f^4$ may be omitted.

In order to insure against crinkling or buckling of the film in its stretch between the rollers $f^2$ and $f^4$, means are employed to constantly exert an influence on the film, tending to straighten it in the direction of its width. The means here shown consist in endless bands or belts $h$, contacting with the rear side of the film near the top of the stand and being constantly driven in a direction to act on the film from the center outwardly. At the inner ends these bands pass around horizontal pulleys $h'$, supported by a bar $h^2$ of the stand $e$, and the stretches of the bands are carried over vertical pulleys $h^3$, supported by said bar, and thence the bands pass around pulleys $h^4$, affixed on a driving-shaft $h^5$.

The film is carried from the sensitizing apparatus to reeling apparatus, which winds the film in rolls and properly preserves it until the sensitive coating becomes set.

The reeling apparatus here shown is constructed and arranged as follows: A pair of wheels $j$ and $j'$ are designed to be rotatively but removably supported in movable frames or carriages $j^2$ and $j^3$, and an apron $j^4$ is attached at its ends to said reels, so as to wind on one while unwinding from the other. This apron is of canvas or other flexible material, and upon one side thereof are secured transversely-extending wooden strips $j^5$, side by side throughout the length of the apron, said strips being formed with outward-projecting lugs $j^6$ at the ends, which serve to separate the convolutions of the apron and provide ample space between the same for the film.

With the apron unwound from one reel $j$ the film as it leaves the coating apparatus is laid in the channel of the apron formed between the end projections $j^6$, and as the reel revolves the film will be rolled up in the convolutions of the apron and the said projections prevent contact between each succeeding convolution of the film and the preceding convolution of the apron. Hence the film can be preserved thus rolled up until the sensitive coating becomes dry.

When the reel is full, the film is severed and another reeling apparatus may be substituted.

When the film in the first reeling apparatus is to be removed, it may again be brought into operative relation with the coating apparatus, and as the apron is unwound from the reel $j$ another length of film will be rolled up with the apron on the reel $j'$.

By reason of the constantly-changing relative diameters of the reels the driving means applied thereto should be arranged to impel the reels at constantly-varying speeds. The driving means here shown and which provide for the variation in speed comprise the following-described elements: A stationary frame $m$ supports a shaft $m'$, on which is loosely mounted a driving-pulley $m^2$, having affixed to it or formed with it a cupped disk $m^3$. A similarly-formed disk $m^4$ is splined to the shaft in juxtarelation to the said disk $m^3$, and between these two cupped disks and adapted to frictionally connect the same is supported a disk $m^5$ in a swiveled holder $m^6$, so that by turning the latter the speed of the shaft may be varied. The means for turning said holder comprise a shaft $m^7$, carrying a worm in mesh with a worm-wheel on the spindle of the holder and arranged to be turned by a handle $m^8$.

The disk $m^4$ is held in frictional engagement with the disk $m^5$ by a spring $m^9$, and may be withdrawn from such engagement by means of a screw-shaft $m^{10}$, engaging the spring and entered through an internally-threaded boss $m^{11}$ on the frame $m$. This screw-shaft is turned by means of a handle $m^{12}$.

The shaft $m'$ extends loosely through a sleeve $n$, which is supported in a bearing on the frame $m$ and carries a worm $n'$ in mesh with a worm-wheel $n^2$, loosely mounted on a shaft $n^3$ in transverse bearings on the frame $m$, and adapted to be operatively connected with said shaft by a clutch $n^4$. Said shaft $n^3$ carries a boss $n^5$, adapted to receive the end of the journal of one of the reels, and said boss has an arm $n^6$, provided with a spring-pressed pin $n^7$ for engagement in a socket of an arm $n^8$, fixed on the reel. This construction, while operatively connecting the shaft and reel, permits ready separation of the reel from the shaft. The sleeve $n$ has affixed to it a cupped disk $n^9$, and the shaft $n'$ has splined to it a similar disk $o$, between which and said disk $n^9$ are interposed a pair of friction-disks $o'$, each supported in a swiveled holder $o^2$, and the stems of these holders carrying segments $y$ in mesh with a worm on a shaft $o^3$, so that by turning said shaft the axial adjustment of the friction-disks may be varied and the speed of the motion transmitted thereby from the disk $o$ to the disk $n^9$ correspondingly varied. The disk $o$ is spring-actuated against the disks $o'$, as shown.

The shaft $m'$ carries splined to it another spring-pressed cupped disk $p$, coacting through friction-disks $p'$ with a cupped disk $p^2$, affixed to a sleeve $p^3$, the said friction-disks being carried in swiveled holders $p^4$, whose stems are provided with segments in mesh with a worm on the shaft $o^3$. The sleeve $p^3$ is loosely mounted on the shaft $m'$ and carries a worm $p^5$, which meshes with a worm-wheel $p^6$, loosely mounted on a shaft $p^7$ and arranged to be operatively connected therewith by a clutch $p^8$. Said shaft may be operatively connected with the other reel through means similar to those employed to connect the shaft $n^3$ and the first-named reel. Through the medium of bevel-gears $q$ the shaft $p^7$ may be connected with a spindle carrying a sprocket-wheel $q'$, and the latter is connected by a chain $q^2$ with a sprocket-wheel $q^3$ on the shaft $o^3$.

It will be understood from the foregoing description that with the two reels operatively connected with the driving means one will be driven at a constantly-decreasing speed while the other is driven at a constantly-increasing speed by reason of the turning of the friction-disks $o^2$ and $p'$ through their connection with the shaft $p^7$. In this way the constantly-varying relative diameters of the reels are compensated for, so that no undue strain comes on the apron. The friction-disks may be conveniently restored to normal adjustment by means of a handle $r$ on the spindle which supports the sprocket-wheel $q'$.

We do not limit ourselves, however, to the employment of means for positively rotating both reels in the manner described, as the supplying-reel may be allowed to rotate loosely, the receiving-roll being positively driven. Means may be provided for applying power to either reel, leaving the other loose.

The carriages which support the reels are preferably arranged to travel on a track $s$, (see Fig. 9,) the carriages having casters $s'$ and being confined to the track by means of lugs $s^2$, received in grooves $s^3$ beside the track and extending under a flange $s^4$ overhanging the groove.

We prefer to give the periphery of the drum a slightly "toothed" or roughened surface analogous to that of ground glass in order that a like surface may be imparted by the drum to the film, while the latter in the form of plastic dope is in contact with the drum. The surface thus imparted to the film enables the sensitive coating to adhere to the film more closely than if the film had a glassy or perfectly smooth surface. The drum may be roughened or grained by means of the sand-blast process or otherwise. We find that it is desirable to coat the drum with some suitable material adapted to be so roughened or grained, such as copper or an alloy of copper and nickel or glass silicate. We do not limit ourselves, however, to the use of the roughened drum and may make the same smooth, if preferred.

An elongated flexible strip made in the manner described by feeding a plastic material onto a revolving cylinder may be used for other purposes. Hence we do not limit our invention to the production of photographic films.

It is essential that the supporting-surface onto which the plastic composition is fed be continuously moved in one direction in order that the stream may be carried continuously along. It is further essential that the said surface be of sufficient area to give the supported material time to be sufficiently seasoned or hardened, so that it will retain its sheet form before leaving said surface. While a cylindrical surface is best adapted to meet the above-mentioned requirements, we do not limit ourselves thereto, and may use any other suitable surface—such, for example, as would be formed by an endless chain of flat links or beds supported by rollers or drums and progressively moved by any suitable means.

We claim—

1. The improved process of making photographic films which consists in feeding the composition which forms the base of the film, onto a moving surface which draws it into a thin strip, carrying the strip over suitably constructed and arranged guides while it becomes seasoned, conducting the strip into a dark room, and passing it through a sensitive emulsion.

2. The improved process of making photographic films which consists in feeding the composition which forms the base of the film, onto a moving surface which draws it into a thin strip, conducting said strip through a sensitive emulsion, carrying the strip over suitably constructed and arranged supports after leaving the emulsion, and subjecting it to a cold-air blast.

3. An apparatus for making photographic films comprising in its construction means for feeding the composition which forms the base of the film in a stream, a moving bed or support which receives the said stream and draws it out over its surface, converting it into a strip, a dark room having a zigzag entrance provided with rollers at its bends through which the strip passes, and means in said dark room for applying a coating of sensitive emulsion to the strip.

4. An apparatus for making photographic films comprising in its construction means for coating a continuous strip of film with a sensitive emulsion, a pair of reels, speed-changing gearing connecting said reels, an apron attached at its ends to said reels and adapted to wind on one while unwinding from the other and to receive the coated strip between its convolutions.

5. An apparatus for making photographic films comprising a sensitizing-trough means for drawing out a stream of dope to form the base of the film, and for conveying said strip through the sensitive emulsion in the trough, and travelers for engaging the sensitized film and exerting an influence thereon, from the middle in an outward direction, as and for the purpose described.

6. An apparatus for making photographic films comprising a sensitizing-trough means for drawing out a stream of dope to form the base of the film, and for conveying said film through the sensitive emulsion in the trough, and endless bands engaging the sensitized film and exerting an influence thereon from the middle outward, for the purpose described.

7. An apparatus for making photographic films comprising in its construction a pair of reels, an apron attached to said reels and adapted to wind thereon and receive the film between its convolutions, and means for varying the relative speed of the reels to compensate for the changing diameters caused by the winding and unwinding of the apron.

8. An apparatus for making photographic films comprising in its construction a continuously-movable bed, means for feeding plastic composition thereto to form a strip of film, means for supporting the strip throughout an extended length to form a seasoning-support for the strip, mechanism for continuously applying a sensitive emulsion to one side of the film while in motion, and means for feeding the strip from the seasoning-support to and through the coating mechanism.

9. An apparatus for making photographic films comprising in its construction a continuously-movable bed, means for feeding plastic composition thereto to form a strip of film, means for supporting the strip throughout an extended length to form a seasoning-support for the strip, mechanism for continuously applying a sensitive emulsion to one side of the strip while in motion, means for feeding the strip from the seasoning-support to and through the coating mechanism, and a flexible carrier adapted to be wound in a roll with the film between its convolutions and provided with transverse strips having projections to separate the convolutions.

10. An apparatus for making photographic films comprising in its construction a continuously-movable bed, means for feeding plastic composition thereto to form a strip of film, means for supporting the strip throughout an extended length to form a seasoning-support for the strip, mechanism for continuously applying a sensitive emulsion to one side of the film while in motion, means for feeding the strip from the seasoning-support to and through the coating mechanism, and travelers for engaging the sensitized film and exerting an influence thereon from the middle in an outward direction.

In testimony whereof we have signed our names to this specification, in the presence of two subscribing witnesses, this 15th day of December, A. D. 1893.

THOMAS HENRY BLAIR.
STUKELY E. WATERMAN.

Witnesses:
F. P. DAVIS,
A. D. HARRISON.